US006738937B1

(12) United States Patent
Bergsten

(10) Patent No.: US 6,738,937 B1
(45) Date of Patent: May 18, 2004

(54) METHOD FOR NONDISRUPTIVE TESTING OF DEVICE AND HOST ATTACHMENT TO STORAGE SUBSYSTEMS

(75) Inventor: James R. Bergsten, Saratoga, CA (US)

(73) Assignee: LSI Logic Corporation, Milpitas, CA (US)

(*) Notice: Subject to any disclaimer, the term of this patent is extended or adjusted under 35 U.S.C. 154(b) by 567 days.

(21) Appl. No.: 09/728,415

(22) Filed: Dec. 1, 2000

(51) Int. Cl.[7] .......................... H04L 1/22; G11C 29/00
(52) U.S. Cl. .................................... 714/718; 714/45
(58) Field of Search .................. 714/42, 718, 27–29; 711/114; 703/23, 27

(56) References Cited

U.S. PATENT DOCUMENTS 4,342,084 A * 7/1982 Sager et al. ................ 714/42
5,530,845 A * 6/1996 Hiatt et al. ................. 703/27
5,794,013 A * 8/1998 McBrearty .................. 703/27

FOREIGN PATENT DOCUMENTS

GB    0 689 143 A1 * 12/1995 .......... G06F/12/08

* cited by examiner

Primary Examiner—Albert Decady
Assistant Examiner—Shelly A Chase
(74) Attorney, Agent, or Firm—Suiter West PC LLO

(57) ABSTRACT

The present invention is directed to a system and method of installing additional devices to storage subsystems without disrupting the overall storage system. The present invention may utilize a storage controller which allows testing of devices while the devices are attached to the system by making the devices functionally transparent to the storage system. Further, the present invention may log and report problems discovered during the testing of devices.

20 Claims, 4 Drawing Sheets

METHOD FOR NONDISRUPTIVE TESTING OF DEVICE AND HOST ATTACHMENT TO STORAGE SUBSYSTEMS

CROSS REFERENCE TO RELATED APPLICATION

The present application is commonly owned and related to U.S. Pat. No. 6,073,209 issuing on Jun. 6, 2000 and is herein incorporated by reference in its entirety.

FIELD OF THE INVENTION

The present invention relates generally to the field of storage systems and more particularly to a system and method for nondisruptive testing of device and host attachment to storage subsystems.

BACKGROUND OF THE INVENTION

The reliable storage of computer data is one of the most important aspects of modern life. From applications and programs, to credit information, web sites, and the like, some of the most important aspects of an individual's life are stored in an electronic form. As more data and information is placed into storage, additional storage space becomes necessary.

When new storage equipment is installed, errors and disruptions in the overall system tend to accompany the installation and a period of time following the installation. The errors may be attributable to manufacturing defects and may be caused during shipping of the product. Presently, most installations of new storage equipment tend to occur during downtimes, after hours for example, to allow enough time for installation and testing. Often, the errors and disruptions that tend to accompany an installation of new storage equipment extend past the allocated time which may result in lost productivity and revenue.

Consequently, it would be advantageous if a system and method existed for nondisruptive testing of device and host attachment to storage subsystems. Further, it would be advantageous if destructive and nondestructive testing could be performed on the newly installed devices without interruption to the storage system by making the newly installed devices transparent to the overall system. Also, it would be advantageous if any problems which were discovered during testing could be logged and reported.

SUMMARY OF THE INVENTION

Accordingly, the present invention is directed to a system and method of installing storage subsystems without disrupting the overall storage system. The present invention is directed to a storage controller which allows testing of devices while attached to the system by making the newly installed devices transparent to the storage system. Further, the present invention is directed to a system and method of logging and reporting problems discovered during the testing of devices of storage systems.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to an embodiment of the invention, examples of which are illustrated in the accompanying drawings.

Figure 1:
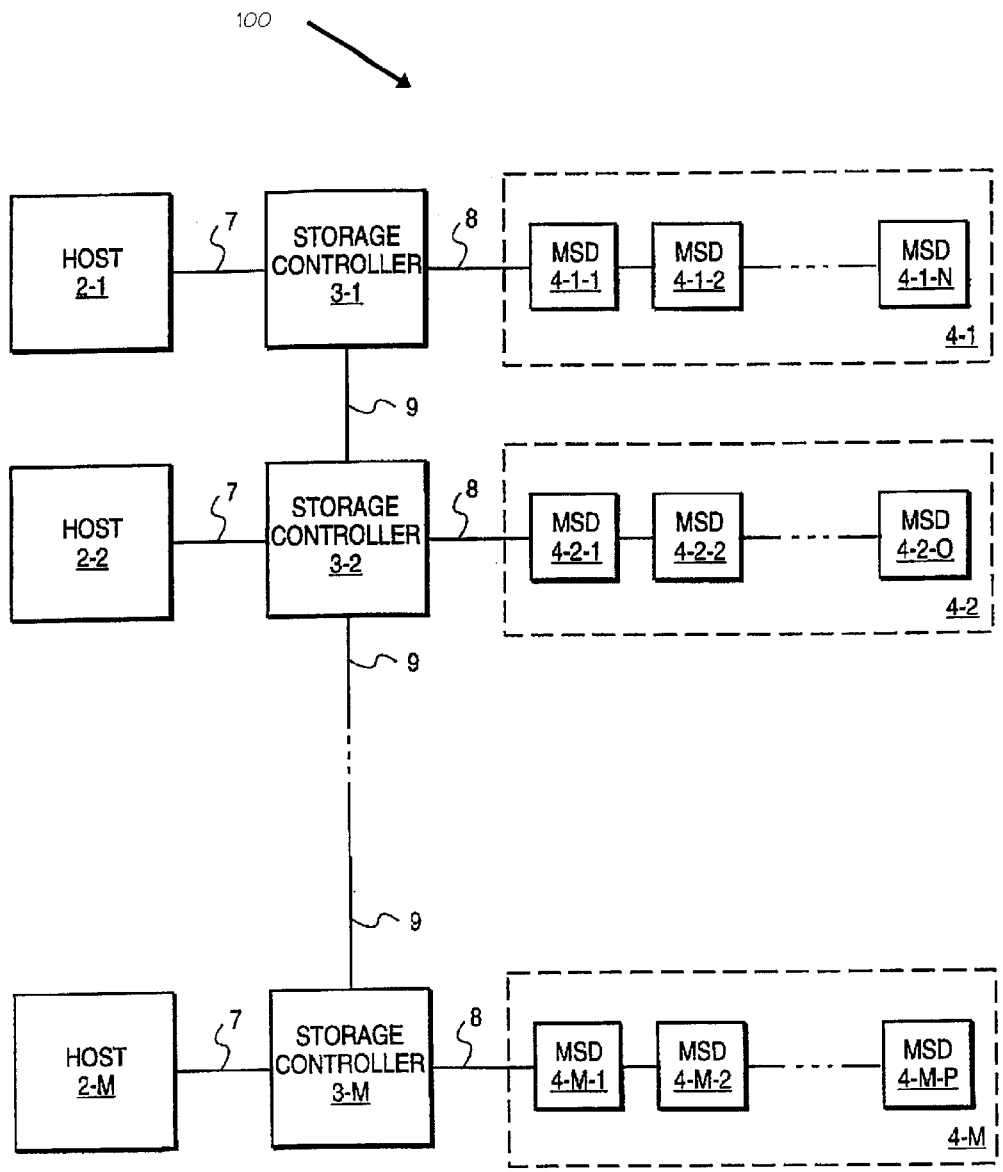
FIG. 1 depicts an embodiment of a system of the present invention.

Referring to FIG. 1, an embodiment of a computing system 100 is shown in which a number of storage controllers of the present invention provide a number of host computer systems with access to a number of storage arrays. The computing system may include M storage controllers, 3-1 through 3-M, M host computers, 2-1 through 2-M, which are coupled to storage controllers 3-1 through 3-M, respectively; and M storage arrays, 4-1 through 4-M; which are coupled to the storage controllers 3-1 through 3-M, respectively.

Each of the storage arrays may include a number of mass storage devices (MSDs) coupled to a storage controller in a daisy chain configuration. Specifically storage array 4-1 includes N MSDs, 4-1-1 through 4-1-N; storage array 4-2 includes O MSDs, 4-2-1 through 4-2-O; and storage array 4-M includes P MSDs, 4-M-I through 4-M-P.

Each of the storage controllers is coupled to another storage controller via a communication link 9. A portion of a communication link 9 between two geographically-separated storage controllers may be provided by a local area network (LAN). For example, in one embodiment, a given communication link 9 may be implemented partly on an Ethernet; other portions of the link 9 can be implemented as an ATM (Asynchronous Transfer Mode) link, a T1 or T3 link, an FDDI (Fiber Distributed Data Interface) link, a SCSI link, a Fibre Channel link, or any other suitable type of link.

Note that any of the data communication paths 7, 8, and 9 may actually consist of two or more redundant, physical paths. Therefore, a failure of any single physical connection does not affect the ability to access any stored data.

Each of the host computer systems 2 may be any conventional computer system. For example, a host computer system may be a personal computer (PC), a mini-computer, or a mainframe. In addition, any of the host computer systems may function as a server for one or more client computer systems (not shown).

Each MSD may include non-volatile facility for storing large volumes of data, such as a magnetic disk or tape, an optical storage device such as CD-ROM (Compact Disk-ROM), CD-R (CD-recordable) DVD (Digital Versatile Disk), a magneto-optical (MO) device, or the like. The MSDs within the computing system need not be of the same device type. That is, the MSDs in any given storage array may use a different type of storage medium from those in any other storage array.

Each storage array may be located geographically distant from the other storage arrays. Multiple copies are generally maintained on different, geographically-separated storage arrays. Hence, the loss of one or more MSDs in a given storage array will not result in the complete loss of data. With respect to a given (local) storage controller, any or all of the other (remote) storage controllers, host computer systems, and storage arrays may therefore be located at distant locations to the local storage controller.

Storage controllers 3-1 through 3-M function cooperatively to provide any of host computer systems 2-1 through 2-M with access to any of storage arrays 4-2 through 4-M. Each one of storage controllers 3-1 through 3-M directly services one local host computer system and one local storage array in one embodiment. For example, in the embodiment shown in FIG. 1, storage controller 3-1 services and is directly coupled to its local host computer system 2-1 via a data communication path 7. Storage controller 3-1 also is directly coupled to its local data storage array 4-1 via another communication path 8.

In one embodiment, each storage controller communicates with its local host computer system and its local storage array using standard SCSI (Small Computer Systems Interface) protocols. Consequently, operation of a storage controller of the present invention in the manner described herein is not dependent upon the particular hardware or software configuration of any host computer or storage array, as long as those devices are SCSI-compatible. Note that in other embodiments, however, the data communication paths 7 and 8 may conform to other protocols and standards, such as serial SCSI, Fibre Channel, or ESCON. Thus, because data paths 7 and 8 are conventional interfaces, a storage controller of the present invention can be used concurrently with host computers and MSDs having different configurations. For example, one host computer in the system may be a mainframe computer system while another host computer is a PC. Similarly, one storage array in the system may consist of conventional magnetic hard disk drives while another storage array consists of CD-ROM drives.

The storage controllers in the computing system cooperate to allow any of the host computer systems to access data located in any of the storage arrays. For example, host computer system 2-1 may access data located on any MSD in storage array 4-1 by communicating with storage controller 3-1. In addition, host computer system 2-1 may access data located in remote storage array 4-M by communicating with remote storage controller 3-M via storage controllers 3-1, 3-2, etc. As will be explained below, data is accessed using virtual addressing, such that a host computer system has no knowledge of which physical storage device is being accessed.

The storage controllers operate in peer-to-peer relationships (as opposed to master-slave relationships) with each other when responding to remove access requests. Any storage controller can access data in a remote storage array serviced by any other storage controller. Communication between individual storage controllers takes place on communication links 9 using a common protocol implemented by all storage controllers in the system. Note that various different protocols might be used for this purpose. A description of the details of such a protocol is not necessary for a full understanding of the present invention and is therefore not included herein.

In general, when the system of FIG. 1 is first set up, or when MSDs are added to the system, all data from a "primary" MSD are automatically copied to one or more newly-added MSDs. Such copying is performed while the host computers are operating, although the copying process is transparent to the host computers 2-1 through 2-M. Copying can be throttled to reduce the impact on system performance. Once all copies are established (brought into a consistent state), only changed data are subsequently written to the secondary MSDs in response to changes dictated by a host computer.

Figure 2:
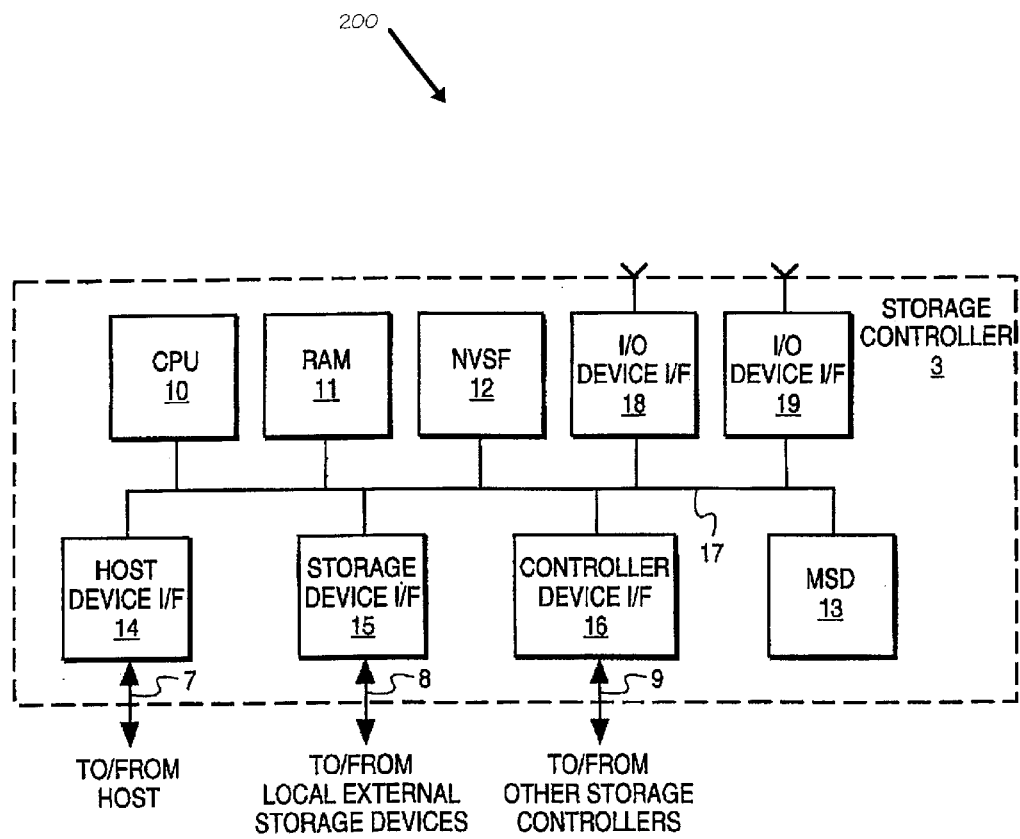
FIG. 2 is a block diagram of an embodiment of a storage controller of the present invention.

FIG. 2 illustrates the hardware architecture 200 of a storage controller of the present invention according to one embodiment. The storage controller 3 includes a central processing unit (CPU) 10, random-access memory (RAM) 11, a non-volatile storage facility (NVSF) 12, an MSD 13, each of which is coupled to a bus 17. Bus 17 may represent multiple physical or logical buses, which may be interconnected by various adapters and/or controllers. NVSF 12 may be, or may include, a programmable non-volatile storage device, such as flash memory or electrically erasable programmable read-only memory (EEPROM). MSD 13 may be any conventional device that is suitable for non-volatile storage of large volumes of data, such as any of those discussed above. Also coupled to the bus 17 are: a host device interface 14, a storage device interface 15, a controller device interface 16, and input/output (I/O) device interfaces 18 and 19. I/O device interfaces 18 and 19 are also coupled to separate, external connectors on the storage controller 3.

The host device interface 14 connects communication path 7 to the bus 17 in order to connect a local host computer to the storage controller 3. The storage device interface 15 connects communication path 8 to the bus 17 in order to connect a local storage array to storage controller 3. In one embodiment, host device interface 14 and storage device interface 15 each comprise a SCSI adapter, such that communication between storage controller 3 and the local host computer and storage array is performed using SCSI protocols. As is well-known, the SCSI standard allows multiple peripheral devices to be connected to a host device in a daisy chain configuration. From the viewpoint of the local storage array, the storage controller 3 emulates the host device. From the viewpoint of the host device, the storage controller 3 emulates the local storage array.

The controller device interface 16 connects communication link 9 to the bus 17 in order to connect a remote storage controller to storage controller 3. Controller device interface 16 may be an Ethernet, ATM, T1, T3 or FDDI adapter, or any other suitable device, depending upon the nature of the communication link 9.

I/O device interfaces 18 and 19 may be used to connect a keyboard and a monitor to the bus 17. I/O interface 18 and 19 may therefore be used by a systems administrator to perform various functions, such as initially configuring the storage controller 3, inputting commands and control information to the storage controller 3, or obtaining status information from the storage controller 3. Furthermore, these interfaces 18 and 19 can be used to remotely perform these same functions on a remote storage controller via (local) storage controller 3 and communication link 9.

In one embodiment, the present invention is carried out in the storage controller by the CPU 10 executing sequences of instructions that are contained in a memory. More specifically, execution of the sequences of instructions contained in the memory causes the CPU 10 to perform steps according to the present invention which will be described below. For example, instructions may be loaded into RAM 11 for execution by the CPU 10 from a persistent store, such as the NVSF 12 or MSD 13. In other embodiments, hard-wired circuitry may be used in place of, or in combination with, software instructions to implement the present invention. Thus, the present invention is not limited to any specific combination of hardware circuitry and software, nor to any particular source for the instructions executed by a computer system.

The ability of the storage controller to provide virtualized data access and emulation is highly advantageous. This may allow for non-disruptive testing of existing and newly installed devices without affecting the overall operation of the storage system. A local storage controller may emulate its local storage array from the viewpoint of its local host computer system; similarly, the local storage controller may emulate its local host computer system from the viewpoint of its local storage array. Such emulation may be implemented, in part, by using a common communication interface for data communication paths 7 and 8, such as SCSI. Again, in other embodiments, the data communication paths 7 and 8 may conform to other protocols and standards, such as serial SCSI, Fibre Channel, or ESCON.

A local host computer accesses data by transmitting a (virtual) host address to its local storage controller. The host address is then mapped to a real address representing a location on one or more physical MSDs, as will be described below in detail. The mapping is completely transparent to all of the host computers. To improve performance, the storage controller may distribute a single copy among multiple MSDs, which may be located in different storage arrays. Hence, in the above described mapping process, a single host address may map to multiple physical addresses, which may be distributed among multiple MSDs, and such MSDs may further be located in different storage arrays.

Through virtual addressing and emulation capabilities of the storage controller of the present invention, expansive testing of devices connected to the storage controller may be possible. When an additional storage device is installed, a MSD for example, it is generally beneficial to perform various tests on the device to ensure proper installation and operation. Testing of installed devices on storage systems known to the art required after hours testing to prevent interruptions. However, device installation is typically error prone hence after hours testing tended to run past the allocated time and result in interruption to normal operation. The storage controller of the present invention can emulate attachment to a host and hence may allow testing of a newly installed device without affecting the storage system. Further if the storage controller is attached to a host, the storage controller may be capable of zoning or fencing a newly installed device from host access.

Figure 3:
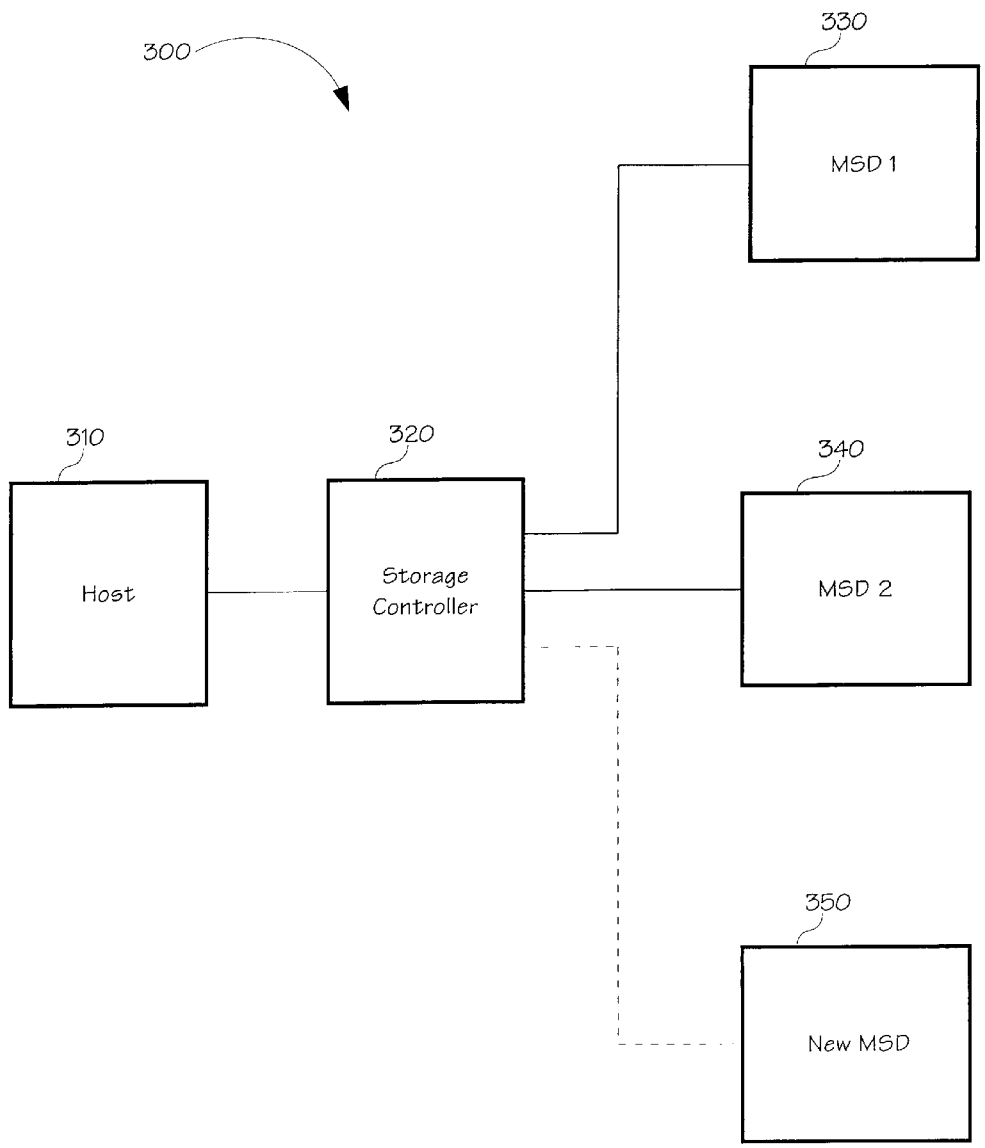
FIG. 3 depicts an embodiment of the transparent nature of devices to the host.

Referring to FIG. 3, an embodiment of a storage system 300 of the present invention is shown. A host device 310 may be connected to a storage controller 320 which may be connected to several MSDs 330–350. One of the MSDs 350 may be newly installed and may require testing to ensure its working properly. Under storage systems known to the art, the storage system would have been offline in order to properly test the newly installed device. With the storage controller 320 of the present invention; the newly installed device may be zoned or fenced from host access. Hence although the newly installed device is electrically connected to a host 310, the newly installed device may be transparent to the host. This may allow testing of the newly installed device without disruption to the operation of the overall storage system 300.

Multiple types and varieties of testing methods may be performed on newly installed devices and existing devices in accordance with a storage system of the present invention. For example, non-destructive testing in the from of data scrubbing and read activity may be performed. This may allow a verification of connections and media. Alternately, destructive type testing may be performed on existing and newly installed devices. While destructive testing may be generally reserved for newly installed devices, existing devices may be destructively tested in accordance with the present invention. Destructive type testing may include writing known data and then reading the data to verify the read/write function. The ability to provide destructive testing is advantageous as it may be utilized to verify correct design and function of a device that is new to the marketplace or not yet placed into production. Another advantage of the present invention is the ability to migrate data from an existing device to a new device and mirror it for a period of time. This may ensure that the new devices function properly in a production environment.

While testing of devices is advantageous, alternative embodiments of the storage system of the present invention may be further capable of reporting and logging any errors found in testing of devices. For example, if an error is found in reading known written data, the incorrect bit or bits may be defined and may allow for easier repair of the device. In other embodiments, the storage system may be capable of repairing the detected error that was reported to the storage system.

In another embodiment of the storage system of the present invention, a series of performance tests may be performed on devices. In addition to determining whether the device is working properly, the efficiency at which a device is operating may be tested. This may be beneficial as transfer data rates, for example, may be tested to determine which devices are working efficiently.

Figure 4:
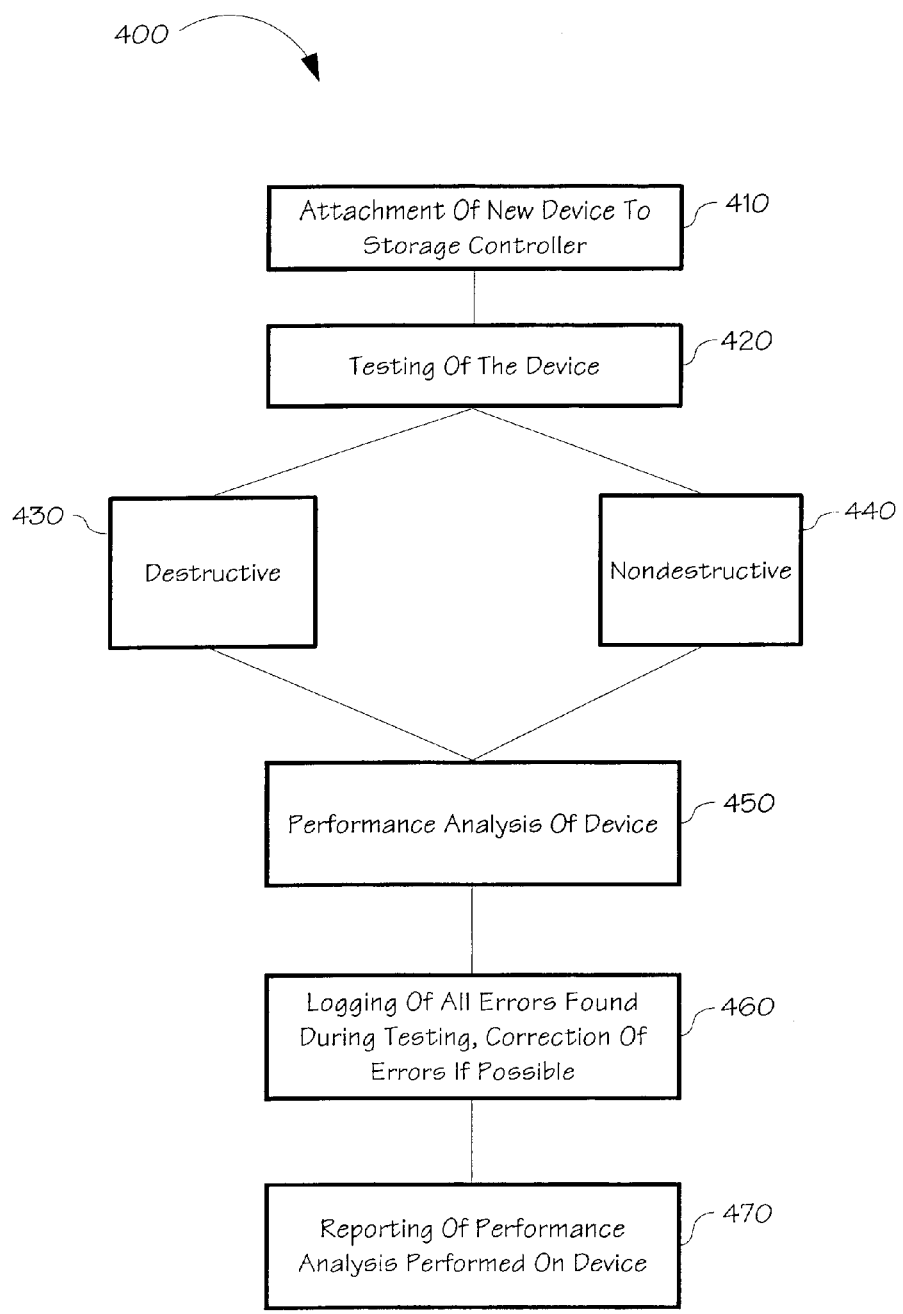
FIG. 4 depicts an embodiment of a process performed by a system of the present invention.

Referring now to FIG. 4, an embodiment of a process 400 which may be performed by a storage system of the present invention is shown. A newly installed device may be attached to a storage controller 410. Testing of the device 420 may be accomplished. Testing of the device may be in the form of destructive testing 430 and non-destructive testing 440.

A performance analysis of the device may also be performed 450. This may include a series of tests to determine the operating efficiency of the device. All errors found during the testing of the device may be logged and correction of errors may be accomplished if possible 460. A reporting of the performance analysis may also be accomplished to display the operating efficiency of the device 470.

While in FIG. 3 a newly installed device is a MSD, it should be known that a newly installed device may be in the form of another host or another storage controller by one of ordinary skill in the art without departing from the scope and spirit of the present invention. The term device being utilized to refer only to another piece of equipment connected forming a portion or piece of the storage system of the present invention.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of testing a device of a storage system, comprising:

(a) emulating a storage system to a device; and (b) testing said device; wherein said device is capable of performing a set of functions during said testing step similar to said set of functions performed during operation with said storage system; said testing of said device being capable of occurring concurrently with said operation of said storage system.

2. The method as claimed in claim 1, wherein said emulating of a storage system is performed by connecting said device with a storage controller of said storage system.

3. The method as claimed in claim 2, wherein said storage controller includes:

(a) a processor; and (b) a memory coupled to the processor, the memory having instructions stored therein which, when executed by the processor, cause the storage controller to:

emulate a local storage array to a local host processing system, such that the presence of said storage controller is functionally transparent to the local host processing system; and emulate said host processing system to said local storage array such that the presence of the storage controller is transparent to said local storage array.

4. The method as claimed in claim 1, wherein said testing of said device includes performance analysis of said device.

5. The method as claimed in claim 1, wherein said testing of said device includes at least one of destructive and non-destructive type testing of said device.

6. The method as claimed in claim 1, further comprising the step of reporting of errors detected during said testing step.

7. The method as claimed in claim 1, further comprising the step of repairing of errors detected during said testing step.

8. The method as claimed in claim 1, wherein said testing of device is capable of occurring while said device is attached to a host processing system by zoning said device from host access.

9. The method as claimed in claim 1, wherein said testing of said device includes at least one of data scrubbing and read activity to verify connections and media.

10. The method as claimed in claim 1 wherein said testing of said device includes writing known data and reading known data to verify read/write function.

11. A method of testing a device of a storage system, comprising:

(a) attaching a device to a storage controller of a storage system;

(b) testing said device; wherein said device is capable of performing a set of functions during said testing step similar to said set of functions performed during operation with said storage system; said testing of said device being capable of occurring concurrently with said operation of said storage system.

12. The method as claimed in claim 11, wherein said storage controller includes:

(c) a processor; and (d) a memory coupled to the processor, the memory having instructions stored therein which, when executed by the processor, cause the storage controller to:

emulate a local storage array to a local host processing system, such that the presence of said storage controller is functionally transparent to the local host processing system; and emulate said host processing system to said local storage array such that the presence of the storage controller is transparent to said local storage array.

13. The method as claimed in claim 11, wherein said testing of said device includes performance analysis of said device.

14. The method as claimed in claim 11, wherein said testing of said device includes at least one of destructive and non-destructive type testing of said device.

15. The method as claimed in claim 11, further comprising the step of reporting of errors detected during said testing step.

16. The method as claimed in claim 11, further comprising the step of repairing of errors detected during said testing step.

17. The method as claimed in claim 11, wherein said testing of device is capable of occurring while said device is attached to a host processing system by zoning said device from host access.

18. The method as claimed in claim 11, wherein said testing of said device includes at least one of data scrubbing and read activity to verify connections and media.

19. The method as claimed in claim 11 wherein said testing of said device includes writing known data and reading known data to verify read/write function.

20. A method of testing a device of a storage system, comprising:

(a) attaching a device to a storage controller of a storage system, said storage controller including a processor; and a memory coupled to the processor, the memory having instructions stored therein which, when executed by the processor, cause the data storage controller to:

emulate a local storage array to a local host processing system, such that the presence of said storage controller is functionally transparent to the local host processing system; and emulate said host processing system to said local storage array such that the presence of the storage controller is transparent to said local storage array, and (b) testing said device; wherein said device is capable of performing a set of functions during said testing step similar to said set of functions performed during operation with said storage system; said testing of said device being capable of occurring concurrently with said operation of said storage system.

* * * * *